(12) United States Patent
Paul

(10) Patent No.: US 6,751,940 B1
(45) Date of Patent: Jun. 22, 2004

(54) HIGH EFFICIENCY GAS TURBINE POWER GENERATOR

(76) Inventor: Marius Paul, 1120 E. Elm Ave., Fullerton, CA (US) 92831

( * ) Notice: Subject to any disclaimer, the term of this patent is extended or adjusted under 35 U.S.C. 154(b) by 22 days.

(21) Appl. No.: 10/141,026

(22) Filed: May 8, 2002

Related U.S. Application Data
(60) Provisional application No. 60/289,675, filed on May 8, 2001.

(51) Int. Cl.[7] .............................................. F02C 3/04
(52) U.S. Cl. ..................................... 60/39.162; 60/788
(58) Field of Search ....................... 60/39.162, 39.15, 60/39.511, 268, 788, 791, 792

(56) References Cited

U.S. PATENT DOCUMENTS

| | | | | |
|---|---|---|---|---|
| 2,322,987 A | * | 6/1943 | West ........................ | 60/39.511 |
| 2,390,959 A | * | 12/1945 | Pfenninger .................... | 60/788 |
| 3,765,169 A | * | 10/1973 | Kyrklund ..................... | 60/792 |
| 4,843,813 A | * | 7/1989 | Paul ........................ | 60/39.162 |
| 5,119,624 A | * | 6/1992 | McKenna .................. | 60/39.15 |
| 6,282,897 B1 | | 9/2001 | Paul | |
| 6,418,707 B1 | * | 7/2002 | Paul .......................... | 60/39.15 |

* cited by examiner

Primary Examiner—Michael Koczo
(74) Attorney, Agent, or Firm—Richard Esty Peterson

(57) ABSTRACT

A gas turbine power generator with ultra high efficiency, the generator being an assembly of electric motor-generator machines and counter rotating turbine configurations used in combination with a combustor having cogeneration of steam for combined cycle operation of select turbine configurations.

9 Claims, 8 Drawing Sheets

HIGH EFFICIENCY GAS TURBINE POWER GENERATOR

This application claims the benefit of provisional application Serial No. 60/289,675, filed May 8, 2001, entitled, "High Efficiency Gas Turbine Power Generator."

BACKGROUND OF THE INVENTION

This invention relates to a new gas turbine power generator with ultra high efficiency.

Actual gas turbine power generator systems, working on simple Brayton cycle, have a limited thermal efficiency near 30%, low power density and degraded thermal efficiency at part loads. This low level of efficiency and power density is the result of low pressure ratio, reduced turbine inlet temperature and a very high air-fuel ratio. Degraded efficiency at part loads is a result of lower pressure ratios associated with reduced power and a lower turbine inlet temperature.

Additionally, typical gas turbines combustion is associated with high level of NOX emission. The result of all these associated, undesirable characteristics is the limited use of gas turbines for power generation leaving the use of gas turbines only for—Peak Shave—power generation and limited time operation (2–3 hours from 24) resulting in high investment for very low income. Typical gas turbines are using a waste-gate system for controlling the over loads. This novel invention eliminates these disadvantages.

SUMMARY OF THE INVENTION

A first characteristic of the new gas turbine power generator is the capability to work at very high pressure ratios of 60–100, which produce thermal efficiencies in the range of 70–80%, eliminating the complexity and ultra high cost of combined cycles in conventional multiple-stage, external cogeneration systems.

A second characteristic of the new gas turbine power generator is the capability to operate at a constant pressure ratio in all the practical ranges of operation, from full load to part loads, resulting in a constant maximum thermal efficiency and in a constant optimum minimum flat specific fuel consumption, using new arrangements of counter rotating gas turbine and counter rotating compressor assemblies.

A third characteristic of the new gas turbine power generator is the capability to work at variable mass flow, from full capacity to low mass flow with constant pressure ratio, using the counter rotating compressor and counter rotating turbine.

A fourth characteristic of the new gas turbine power generator is the implementation of a high frequency pulsatory combustion, eliminating the compact combustion flame, by including multiple air and steam infusions for reduction of local high temperature concentrations.

A fifth characteristic of the new gas turbine power generator is the combined stem generation and combustion chamber for internal steam cogeneration and low compression work.

A sixth characteristic of the new gas turbine power generator is the use of new electrical motor generator machines based on this concept and the implementation of an intake side-driving shaft, eliminating the necessity for high pressure sealing systems.

A seventh characteristic of the new gas turbine power generator is the elimination of the waste-gate system.

An eighth characteristic of the new gas turbine power generators to have all the compressors and turbines attached in total axial balance, with zero axial loads, forming groups of modules for turbo compressors-turbines, compressors-compressors and turbines-turbines.

DETAILED DESCRIPTION OF THE PREFERRED EMBODIMENTS

Figure 1:
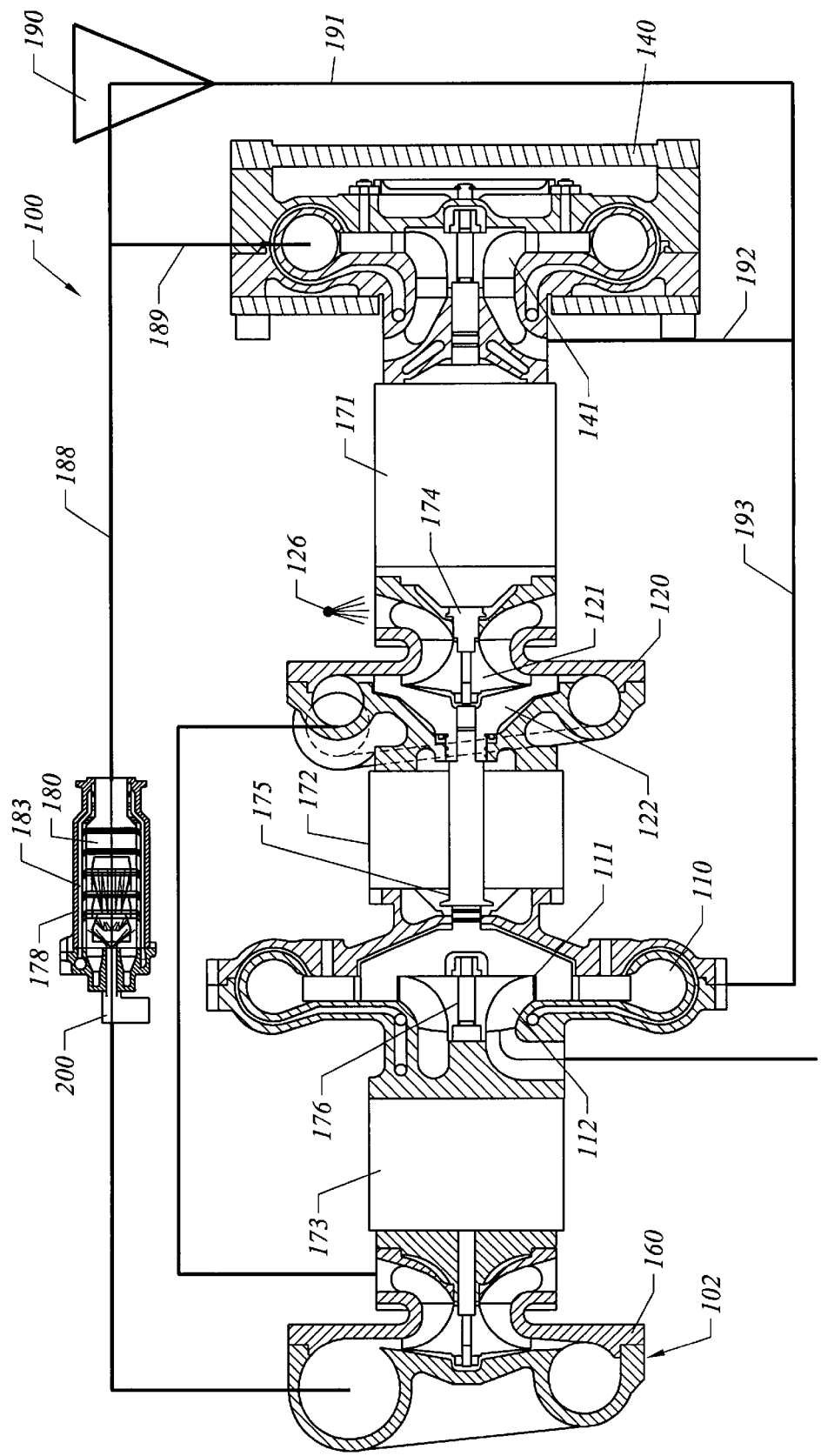
FIG. 1 is a schematic view of the ultra high efficiency gas turbine power generation system.

The general concept and arrangement of the new ultra high efficiency gas turbine power generator is identified with the generic number 100 in FIG. 1. The gas turbine power generator 100 has in a main assembly 102: a counter rotating gas turbine 110 and a counter rotating compressor 120 in combination and described in detail in FIG. 2; an ultra high pressure variable geometry gas turbine 140, described in detail in FIG. 3; an electric motor driven compressor 160 described in detail in FIG. 4; and, an ultra high pressure combustor 178, described in detail in FIG. 5. A series of electric motor-generator machines 171, 172 and 173 are integrated in the assembly 102 by the associated three shafts 174, 175 and 176.

Operation of the ultra high efficiency gas turbine power generator 100 is started by the action of the electric motor 171, driving the central compressor rotor 121, and by the action of the electric motor 172, driving the counter rotating compressor rotor 122 of the counter rotating compressor 120.

The first stage compressed air, at a pressure ratio of 1–16–25, is delivered to the electric motor driven compressor 160, activated by the electric motor 173, with a pressure ratio of 4/1, resulting in a final ultra high pressure ratio of 40–64–100. Contemporaneously with compressed air delivery, a very fine water spray 126 is injected into the intake of the counter rotating compressor 120 for controlling the compression temperature, and for reducing the compression 4 work. The ultra high pressure wet air is conducted into the ultra high pressure combustion chamber 180 of the combustor 178. Fuel is injected into the high pressure combustion chamber 180 in multiple pulsatory fuel jets and steam is internally cogenerated in the high pressure water/steam jacket 183.

The combusted gases and the internally cogenerated steam are conducted to the ultra high pressure variable geometry gas turbine 140 and partially to the counter rotating gas turbine 110 by passing some gas-steam through the variable geometry valve 190 and the pipe 191 where the gas-steam is associated with the exhaust gases 192 from the gas turbine and conducted to the counter rotating gas turbine 110 through pipe 193.

The central turbine rotor 141 drives the central rotor 121 of the compressor 120 and the electric motor-generator machine 171 that creates the original mass flow and preliminary pressure. The expanded gases from the high pressure variable geometry gas turbine 140 are associated and mixed with the by-pass gases from the combustion chamber 180, and are conducted through the variable geometry counter rotating gas turbine 110, which is driving the counter rotating rotor 111, and the counter rotating rotor 122 of the counter rotating compressor 120, delivering the first stage compressed air pressure, 10–16–25. The central rotor 112 of the gas turbine 110 is driving the electric motor driven compressor 160 and the electric generator 173 delivering the final ultra high air pressure, 40–64–100 bar.

An essential and specific feature of the ultra high efficiency gas turbine generator 100 is the capability to operate at variable loads and variable mass flow, conserving the total maximum pressure ratio, resulting in a constant efficiency and constant flat specific fuel consumption. The power density of the ultra high efficiency gas turbines is also maximum because all the compressed air can be used for combustion at stoichiometric level 15/1, instead of 60/1 in actual conventional gas turbines by dilution of combustion gases from the internal steam cogeneration, which provides control of the turbine inlet temperature at any level. The result is at least 4 times more power than the same turbine using excess air to dilute the combusted gases.

By regulating the gas flow in the variable geometry ultra high pressure gas turbine 140 using the variable by-pass valve 190, the power and the rotation of this turbine can be controlled to supply a desired original mass flow, and at the intermediate pressure, the by-passed gases and exhaust gases from the gas turbine 140 are driving the counter rotating turbine 110, which in turn is controlling the final constant compression pressure, at any and all mass flow. The electric motor-generator machines 171, 172 and 173 are working at the start-up as motors to initially drive the compressors and, after start-up, as electric generators, absorbing the available supplementary power in excess of the compressors power.

Figure 2:
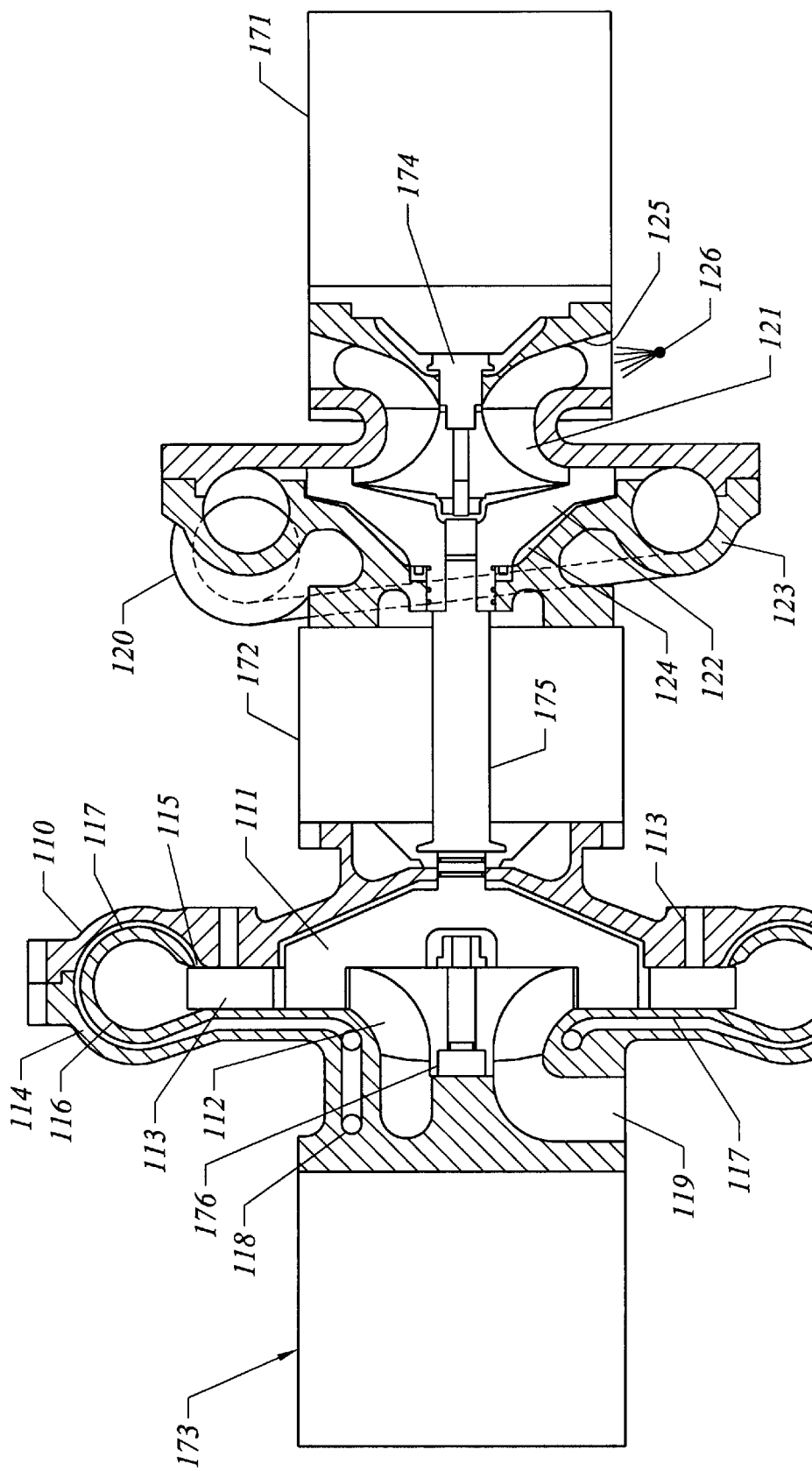
FIG. 2 is a detailed schematic of the counter rotating variable geometry gas turbine and counter rotating high pressure compressor in combination with integrated motor-generator electric machine.

In FIG. 2 the arrangement of the counter rotating assembly of the variable geometry counter rotating gas turbine 110 and the counter rotating compressor 120 are depicted in greater detail. The variable geometry gas turbine 110 has a counter rotating rotor 111 surrounding a central turbine rotor 112 provided with variable vanes 113. The variable geometry vanes 113, regulate the effective area for the flow and direction of the gases driving the peripheral rotor 11 of the turbine 110, which is driving the peripheral rotor 122 of the compressor 120 and the electric machine 172 by the common shaft 175. The central turbine rotor 112 is driving the electric machine 173 and electric motor driven compressor 160 by the common shaft 176. The rotating compressor 120 is provided with the central rotor 121, which is controlling the mass flow and the preliminary pressure and is driven by the rotor 141 of the ultra high pressure variable geometry turbine 140 by the common shaft 176. The electric motor-generator machine 171, working as an electric generator will extract excess power produced by the ultra high pressure turbine 140.

The gas turbine 110 is provided with a split external housing 114 and an internal housing 116. The gap 117 between the housing 114 and 116 forms a water/steam jacket which creates an internal steam cogeneration and a cooling energy recovery when injected water is transformed to steam adding more working fluid to the original gas steam flow. The water is injected through the ring passage 118 and the generated steam enters the motive gas flow through annular gap 115. The combined exhaust gases are ejected through the exit port 119. As noted, the electric machines 171, 172 and 173 are working as motors at the start, and as generators during normal operation, supplying the power grid the excess of generated power over the power used by the compressor.

Figure 3:
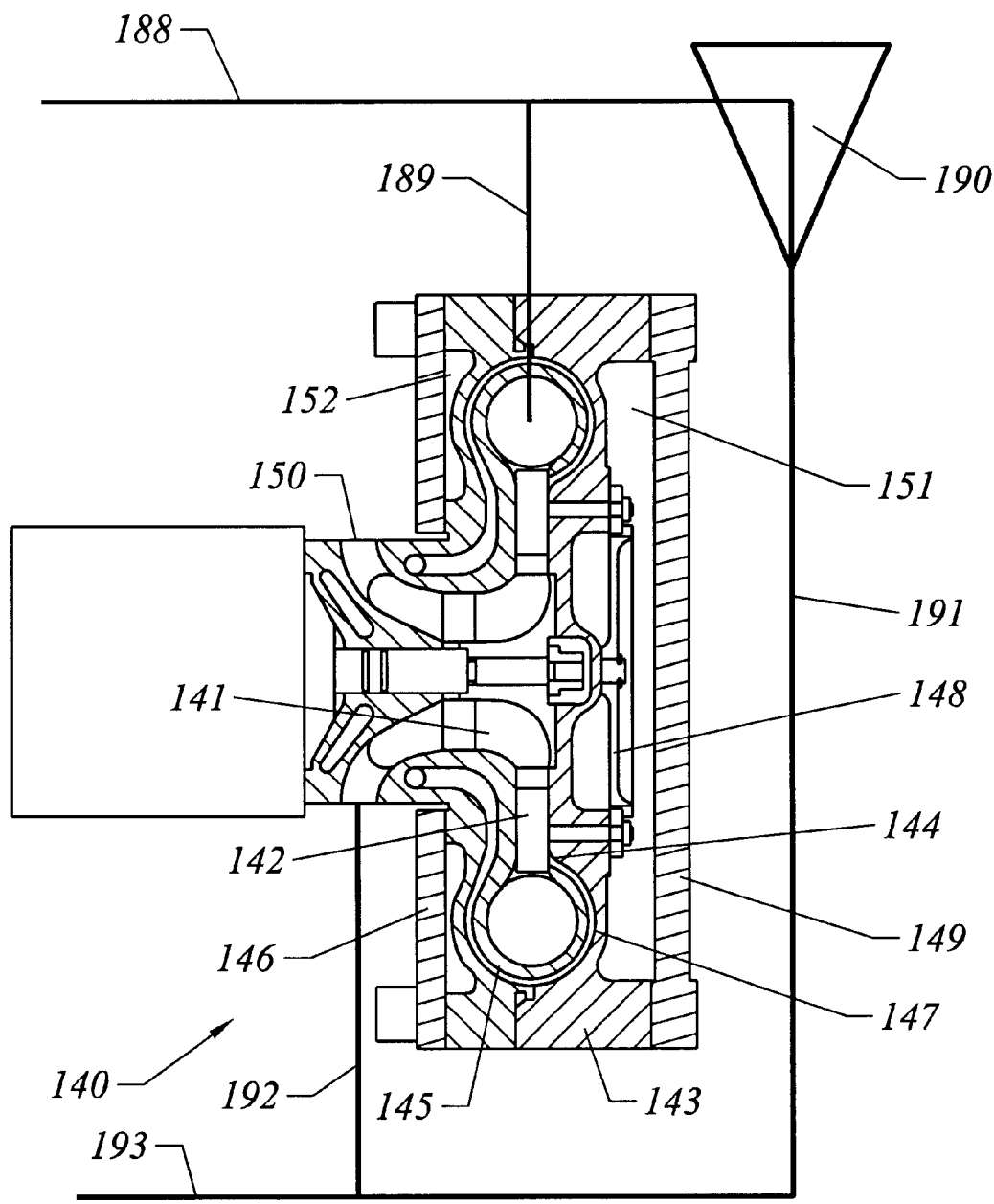
FIG. 3 is a detailed schematic of the ultra high pressure variable geometry gas turbine generator.

In FIG. 3 the ultra high pressure variable geometry, one-stage gas turbine 140 is depicted. The high pressure gas turbine 140 is provided with the central turbine rotor 141, the variable geometry vanes 142, a split external housing with an inner housing 145. Between the external housing 143 and the internal housing 145 is an internal gap 147 in which is injected high pressure water. The water is converted in a process of internal cogeneration into high pressure steam, which is injected into the gas stream through annular gap 144 and functions as an additional working fluid while recovering all the cooling energy. Outside jacket plates 146 and 149 close both sides of the external turbine housing and form plenums 151 and 152 into which compressed air having the same pressure as the combustion gases is introduced to balance and eliminate any stress of the external turbine housing 143. The final result of this arrangement is a total elimination of the mechanical and thermal stresses in the turbine housing enabling a light weight turbine to operate at ultra high pressure.

The combustion and steam gases delivered by the combustion chamber 180 of the high pressure combustor 178 through the transfer pipe 188 are diverted to the high pressure turbine 140 through the pipe 189 and to the variable geometry by-pass valve 190. Motive gases diverted through the variable geometry by-pass valve pass through the pipe 191, combine with the gases from the turbine exhaust pipe 192, and are conducted to the counter rotating turbine 110 through the transfer pipe 193. The by-pass ratio will control the power produced by the ultra high pressure turbine 140, the rotation of the turbine 141, and the rotation of the central compressor rotor 121. The rotation of the central compressor rotor in turn controls the mass flow and the preliminary pressure ratio of the counter rotating compressor 120. The high pressure by-passed gases and the exhaust gases drive the counter rotating turbine 110 at the proper level to maintain the constant pressure of the compressor at prescribed level.

Figure 4:
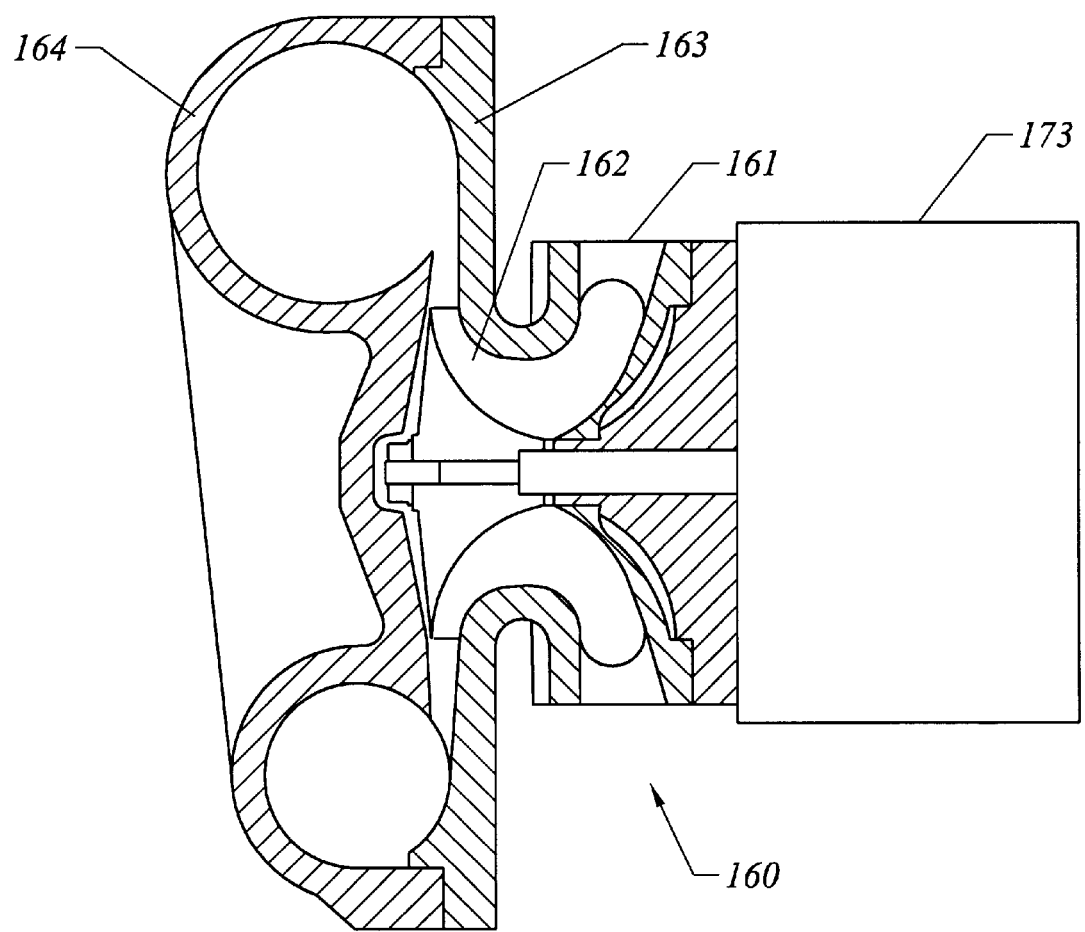
FIG. 4 is a detailed schematic of the electric motor driven compressors with an intake side driving shaft.

In FIG. 4 the electric motor driven compressor 160 is shown provided with an electric housing 164, an intake port 161, a central rotor 162, and an intake housing 163. The central rotor 162 is connected with the electric motor-generator machine 173, which is an electric starter drive and, during operation, an electric generator, for the excess power produced by the counter rotating turbine 110.

Figure 5:
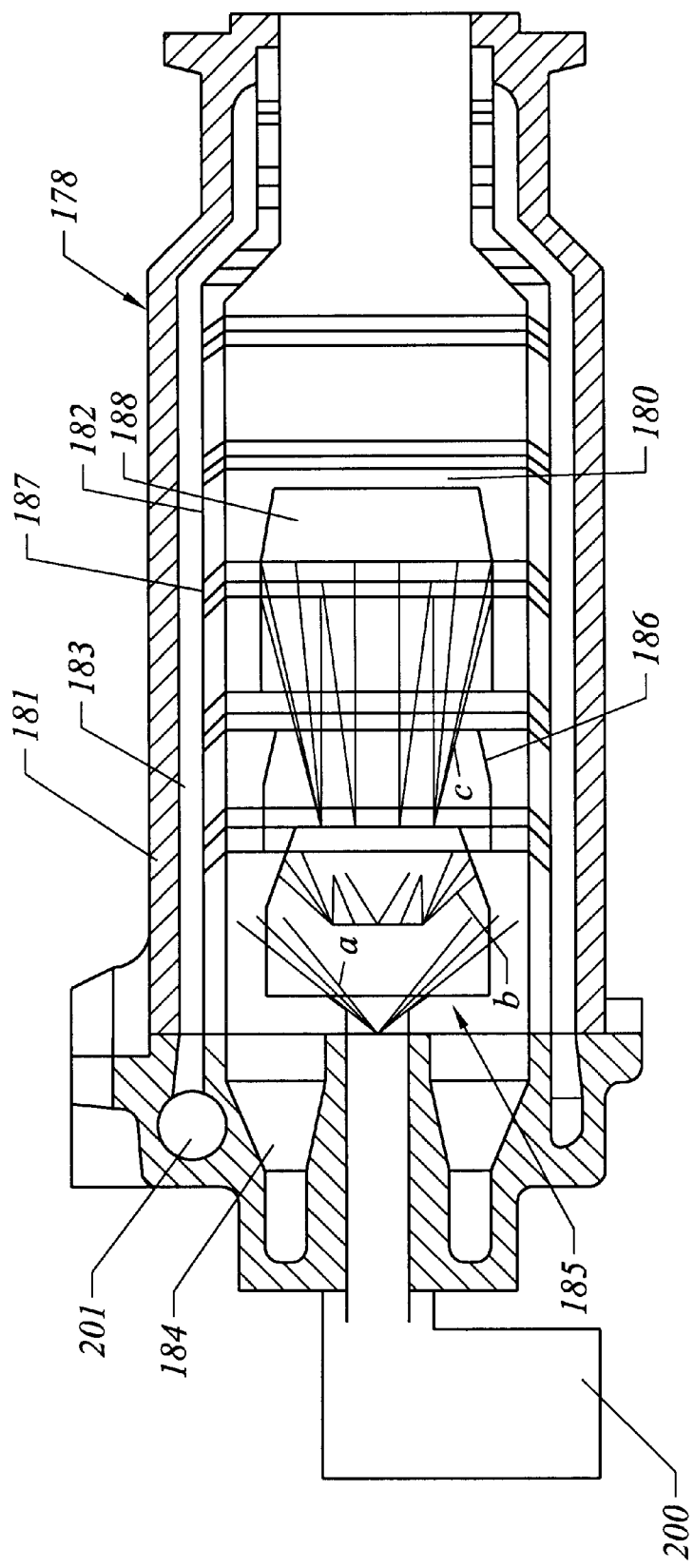
FIG. 5 is a schematic of the ultra high pressure combined steam and gas combustor, or gas combustion chamber with a combination chamber having a high frequency pulsatory combustion system.

In FIG. 5 the ultra high pressure combustor 178 is shown. The high pressure combustor 178 has an internal cogeneration chamber 180 constructed with an external housing 181, an internal housing 182, a water steam jacket 183 having peripheral-swirl, air induction vanes 184, and pulsatory fuel jet injectors 200, and a high pressure water supply intake 201. The combustion chamber 180 is provided with multiple staged, air-steam deflectors 186 and steam injectors 187. The air-steam injection and deflector passage divide the combustion flame into successive stages, and by fuel injection with high frequency pulsatory fuel injectors 200 with staged injectors 185 at a, b and c, the dilution of the combustion gases by air steam injection allow control of the temperature of the combustion process at any level eliminating NOX formation.

Replacing a conventional dilution by excess air with dilution of steam allows all the compressed air to be used for total combustion at stoichiometric level 15/1, thereby producing a maxim absolute power density of at least four times that of conventional gas turbines.

Figure 6:
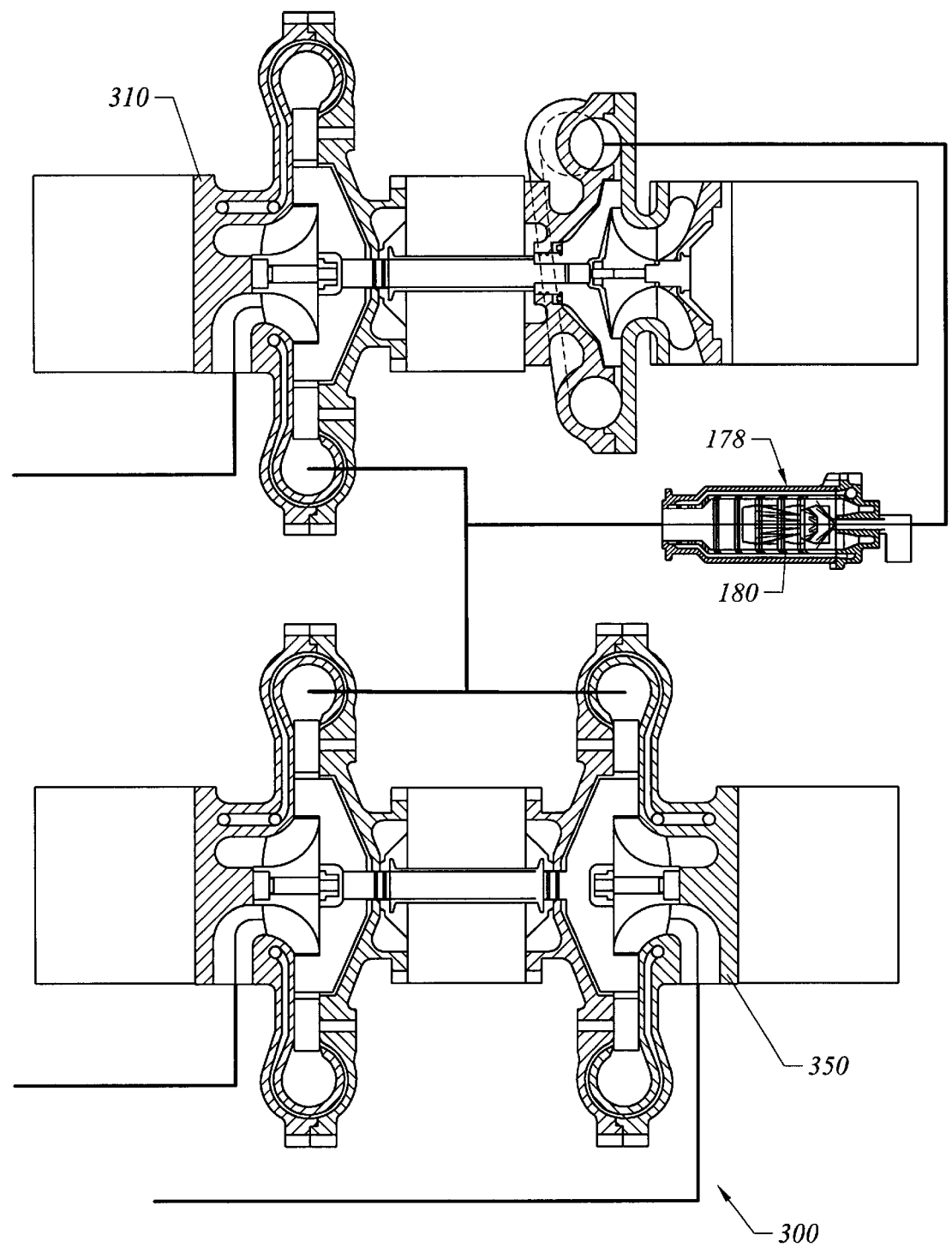
FIG. 6 is a detailed schematic of modular units of total axial balanced turbomachinery.
Figure 7:
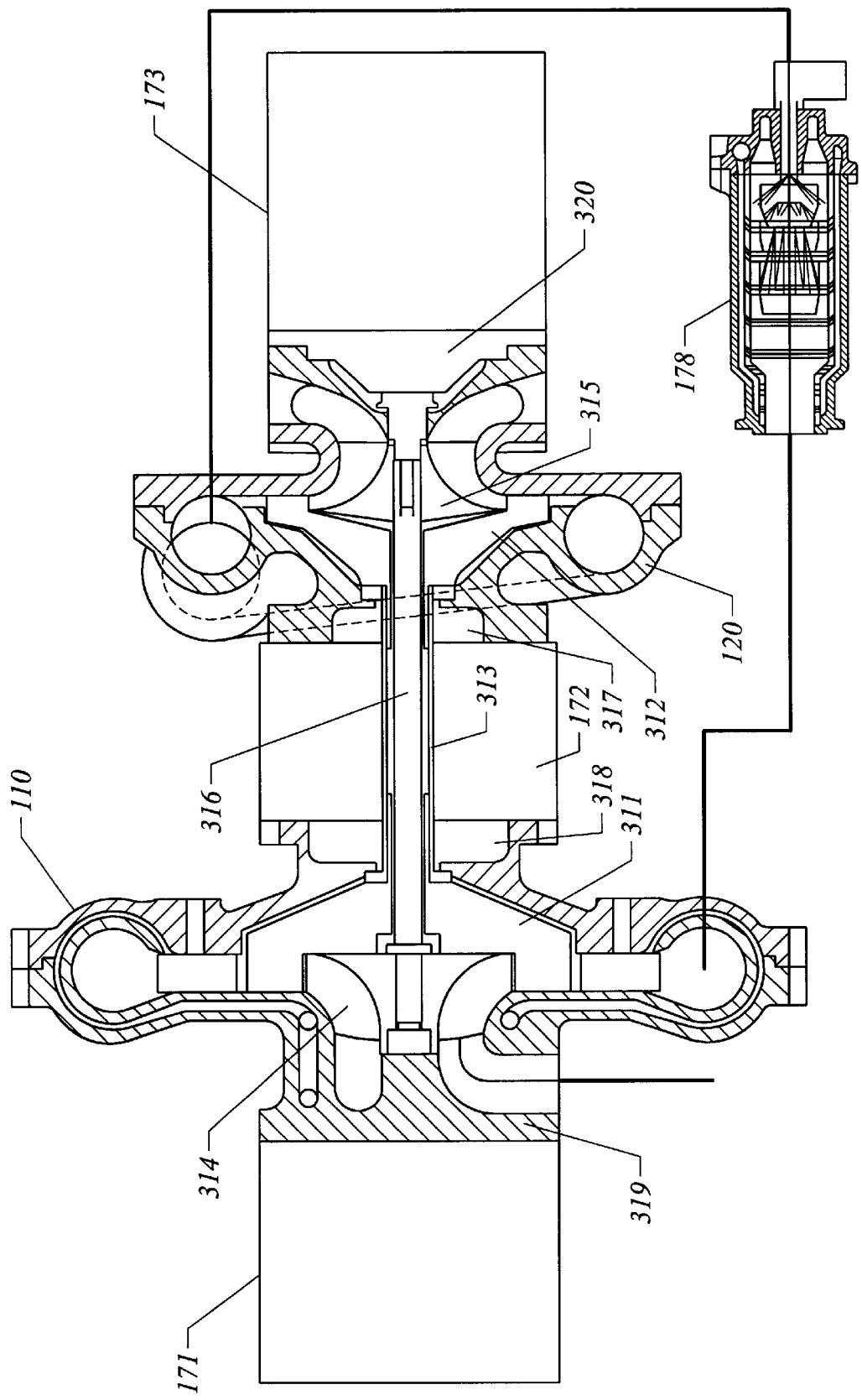
FIG. 7 is a detailed schematic of the gas turbine electric turbo compressor with total axial balance.
Figure 8:
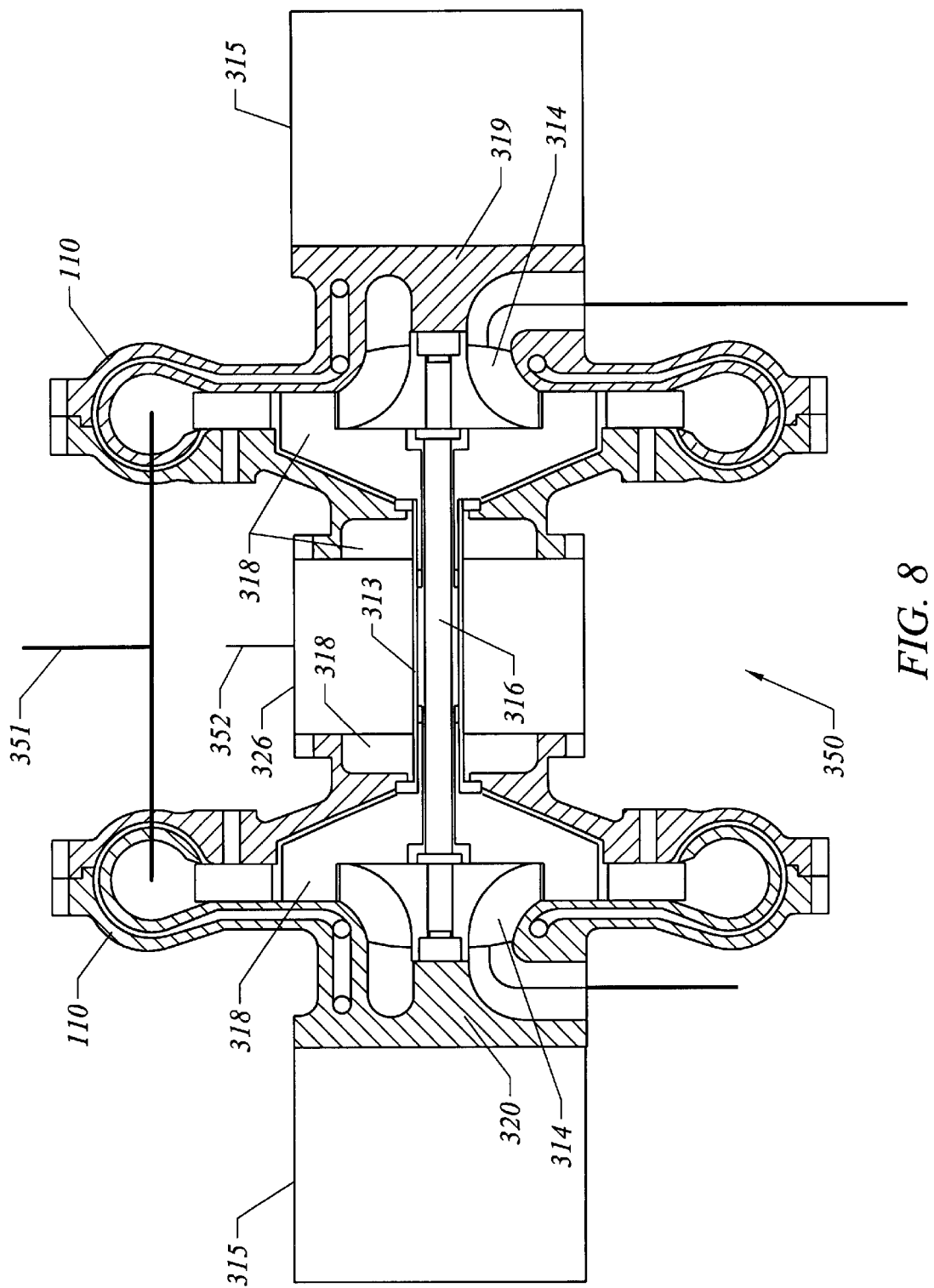
FIG. 8 is a detailed schematic of the turbo electric generator unit with total axial balance.

In FIG. 6 there is depicted a modular gas turbine structure, designated by the generic number 300, constructed with a turbo compressor electric power generator 310, with total axial balanced rotors and air floating bearings, described in detail in FIG. 7, a turbo-turbine electric power generator 350 with total axial balance rotors and air floating bearings, described in detail in FIG. 8 and a high pressure combustor 178, described in detail in FIG. 5.

In FIG. 7 the turbo electric compressor generator 310 is shown in greater detail. The turbo electric compressor generator 310 is provided with a counter rotating peripheral turbine rotor 311 interconnected with the counter rotating peripheral compressor rotor 312 by the spool shaft 313. A central turbine rotor 314 is interconnected with the central compressor rotor 315 by a central shaft 316. The electric machine motor-generator machine 172 is suspended by the air bearing 317, 318, 319 and 320 which are also included in the electric motor-generator machines 171 and 173. All of the rotary components of the counter rotating turbo compressor generator 310 have axial forces balanced. The operation of the gas turbine group is described with reference to the operation of the components in FIGS. 2, 3 and 4, and have the specific characteristic of total axial balance.

In FIG. 8, the counter rotating, symmetric double turbine unit 350 have combined turbine components 110 similar to the compressor generator 110 in FIG. 7. The double turbine unit 350 has a specific common working gas supply 351 distributed symmetrically to both high pressure turbines 110 in a mirror arrangement. The components are described in detail in FIG. 2 and 3 and are provided with a pressurized compressed air supply 352 of pressure equal to or greater than the pressure of the combusted gases for cooling the electric motor-generator machine 326 and for balancing the axial forces.

The combined modular gas turbine depicted in FIG. 6 works at a permanent constant pressure that is created and maintained constant, independent of any loads by the independent work of the group of turbo electric compressor generators depicted in FIG. 7. The full and partial loads of operation are satisfied solely by the turbo-turbine electric generator, depicted in FIG. 8, which operates independently from the turbo electric compressor generator. The result is a constant pressure cycle, with maximum efficiency and minimum specific fuel consumption throughout the entire practical range of operation.

What is claimed is:

1. A high efficiency gas turbine power generator comprising:

an ultra high pressure combustor having a gas intake, an internal cogeneration chamber with fuel injection, steam injection and a motive gas transfer pipe;

a one-stage, ultra high pressure gas turbine connected to the motive gas transfer pipe of the combustor, the ultra high pressure gas turbine having a central rotor;

a first electric motor-generator having a shaft connected to the central rotor of the ultra high pressure gas turbine;

a counter rotating compressor having a central rotor connected to the shaft of the first electric motor and a counter rotating peripheral rotor around the central rotor;

said second electro motor-generator having a shaft connected to the peripheral rotor of the counter rotating compressor;

a counter rotating gas turbine having a central rotor and a counter rotating peripheral rotor around the central rotor;

said second electric motor-generator having a shaft connected to the peripheral rotor of the counter rotating gas turbine;

an electric motor driven compressor having a central rotor and a compressed gas output conducted to the gas intake of the ultra high pressure combustor; and a third electric motor-generator having a shaft connected to the central rotor of the electric motor driven compressor and to the central rotor of the counter rotating gas turbine, wherein the electric-motor generators at start-up initially operate as motors driving the counter rotating compressor and electric motor driven compressor and after start-up operate as electric power generators.

2. The high efficiency gas turbine power generator of claim 1 comprising further:

a second motive gas transfer pipe connected to the motive gas transfer pipe connecting the combustor and the ultra high pressure gas turbine, the second transfer pipe having a valve and being connected to the counter rotating gas turbine, wherein a portion of motive gases from the combustor are diverted to the counter rotating gas turbine.

3. The high efficiency gas turbine power generator of claim 2 wherein the ultra high pressure turbine has exhaust gases and a pipe conducting the exhaust gases of the ultra high pressure turbine to the counter rotating gas turbine.

4. The high efficiency gas turbine power generator of claim 1 wherein the ultra high pressure gas turbine has vanes controlling flow of motive gas through the turbine.

5. The high efficiency gas turbine power generator of claim 1 wherein the ultra high pressure gas turbine has an external and internal housing with a gap therebetween the gap containing water heated to steam wherein steam is injected into the motive gas through the turbine.

6. The high efficiency gas turbine power generator of claim 1 wherein the counter rotating compressor has an intake with a water spray wherein the water spray vaporizes to cool the compressor on compression.

7. The high efficiency gas turbine power generator of claim 1 wherein the combustor has steam injection into the combustor controlled according to the inlet temperature of the ultra high pressure turbine.

8. The high efficiency gas turbine power generator of claim 1 wherein the combustor has multiple, staged fuel injectors.

9. The high efficiency gas turbine power generator of claim 1 wherein all shafts are axially aligned.

\* \* \* \* \*